(12) United States Patent
Duwel

(10) Patent No.: US 7,021,447 B2
(45) Date of Patent: Apr. 4, 2006

(54) APPLY PISTON SEAL FOR A CLUTCH

(75) Inventor: Jeffrey Alan Duwel, Plymouth, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/819,537

(22) Filed: Apr. 7, 2004

(65) Prior Publication Data

US 2005/0224309 A1 Oct. 13, 2005

(51) Int. Cl.
*F16D 25/0638* (2006.01)

(52) U.S. Cl. .............. 192/106 F; 192/85 AA
(58) Field of Classification Search ........... 192/85 AA, 192/85 CA, 106 F, 112
See application file for complete search history.

(56) References Cited

U.S. PATENT DOCUMENTS

| 5,542,517 | A | * | 8/1996 | Peruski ................. 192/85 AA |
| 5,887,690 | A | * | 3/1999 | Haupt ................... 192/87.11 |
| 6,464,059 | B1 | * | 10/2002 | Kundermann et al. ... 192/87.11 |
| 2005/0217962 | A1 | * | 10/2005 | Pedersen et al. ........ 192/85 AA |

* cited by examiner

*Primary Examiner*—Saul Rodriguez
(74) *Attorney, Agent, or Firm*—Ronald W. Wangerow; Harness, Dickey & Pierce, P L C

(57) ABSTRACT

An apply piston seal is provided for a clutch assembly utilizing a balance piston. The apply piston seal is bonded to the apply piston and provides a sealing relationship between the apply piston and balance piston. By bonding the seal to the apply piston, the manufacturing of the balance piston can be simplified in order to reduce cost for the overall clutch assembly.

4 Claims, 3 Drawing Sheets

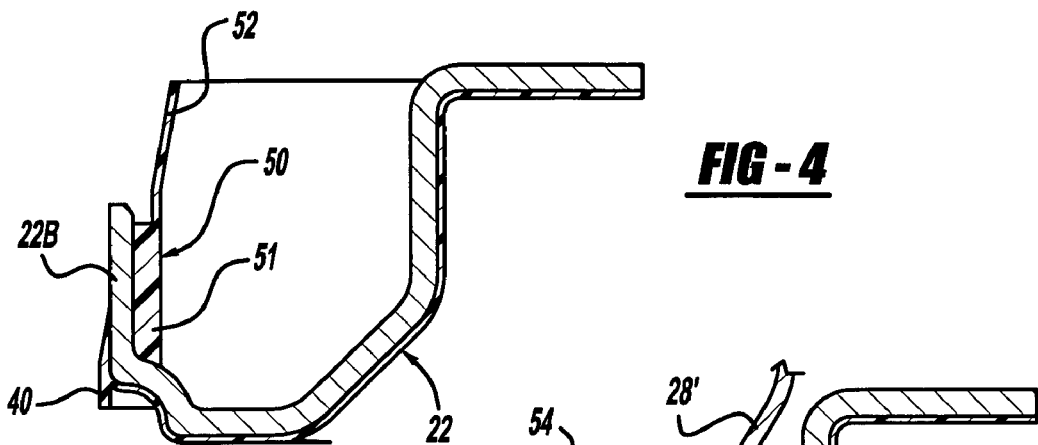
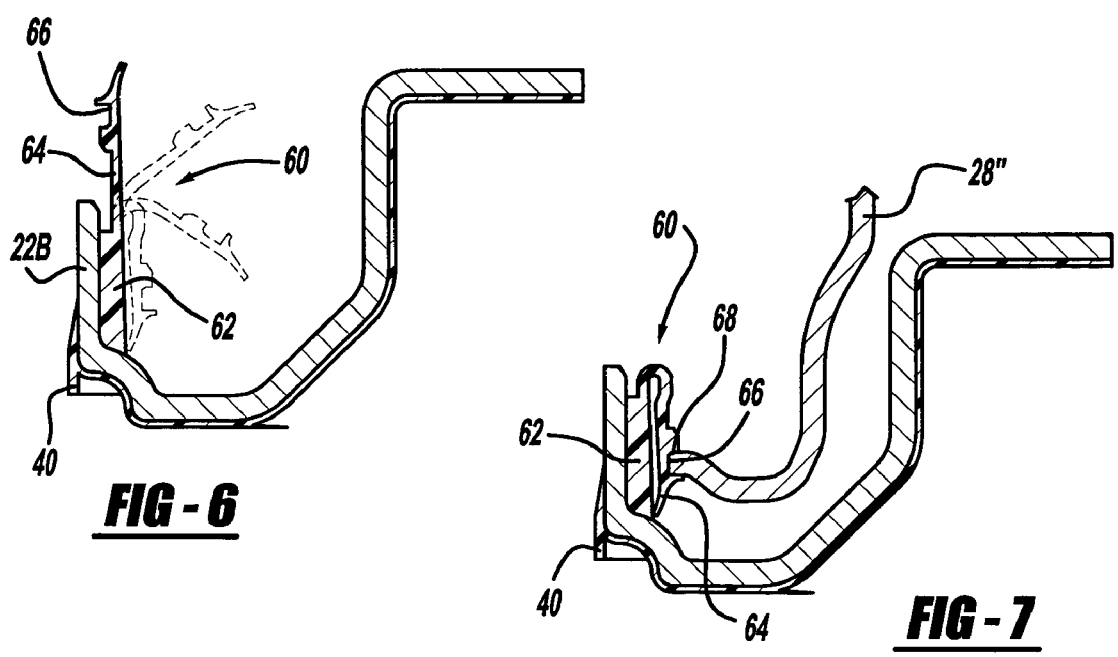

APPLY PISTON SEAL FOR A CLUTCH

FIELD OF THE INVENTION

The present invention relates to a clutch assembly, and more particularly, to a clutch and balance piston assembly having a seal disposed between the apply piston and balance piston.

BACKGROUND AND SUMMARY OF THE INVENTION

In a typical clutch assembly for an automatic transmission (as illustrated in FIG. 8), a clutch pack 16 is provided for providing a frictional engagement between a first member 12 and a second member 14 which is rotatable relative to the first member 12. A piston 122 is provided within a fluid chamber 24 such that the application of fluid pressure to the fluid chamber 24 causes the piston 122 to move into engagement with the clutch pack 16 to frictionally engage the second member 14 to the first member 12. The contacting of the friction plates with increasing pressure eventually causes the rotation of the second rotatable member 14 which the system is designed to engage. A problem that has been recognized in the art for a typical clutch assembly of this type is that the centrifugal force of the fluid can put a positive pressure on the apply piston 122 as illustrated in FIG. 8. The pressure generated by the centrifugal force of the fluid can cause unintended engagement of the clutch pack 16.

Thus, a balance piston system has been developed as illustrated in FIG. 9 in which the balance piston 128 is disposed between the apply piston 122 and the clutch pack 16 so that hydraulic fluid is present on opposite sides of the apply piston 122. When the balance piston system is spinning, the balance piston 128 traps fluid at the outer edge of the cavity 130 that it creates with the apply piston 122 to counteract the centrifugal forces caused by the fluid on the other side of the apply piston 122 as illustrated in FIG. 9. The balance piston 128 is provided with a seal member 126 that is bonded to an outer edge 122B and contacts an inner surface of the axially extending arm 122B of the apply piston 122. This seal is critical for the proper functioning of the balance piston system. With the seal 126 applied to the outer surface of the balance piston 128, the complexity and cost of the manufacture of the balance piston 128 is significantly increased.

The present invention provides a balance piston/apply piston assembly that differs from typical assemblies in that the sealing elastomer (or other material) which is used to create the seal between the balance piston and the apply piston is bonded to the apply piston, not the balance piston as in typical assemblies. The fact that all of the rubber molding occurs on the apply piston, and none on the balance piston, provides a significant cost advantage over the typical assembly design where rubber must be molded to both components. With this invention, the balance piston's fabrication does not require adhesive or molding of rubber, and thus, no quality processes are required relating to a post-molded rubber inspection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a cross-sectional view of an apply piston having an alternative seal design including a seal skirt according to the principles of the present invention;

FIG. 5 illustrates the apply piston and seal shown in FIG. 4 in combination with a balance piston according to the principles of the present invention;

FIG. 6 illustrates a cross-sectional view of a second alternative embodiment of an apply piston and seal arrangement bonded to the apply piston according to the principles of the present invention;

FIG. 7 is a cross-sectional view showing the apply piston and seal as shown in FIG. 6 in combination with a balance piston according to the principles of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
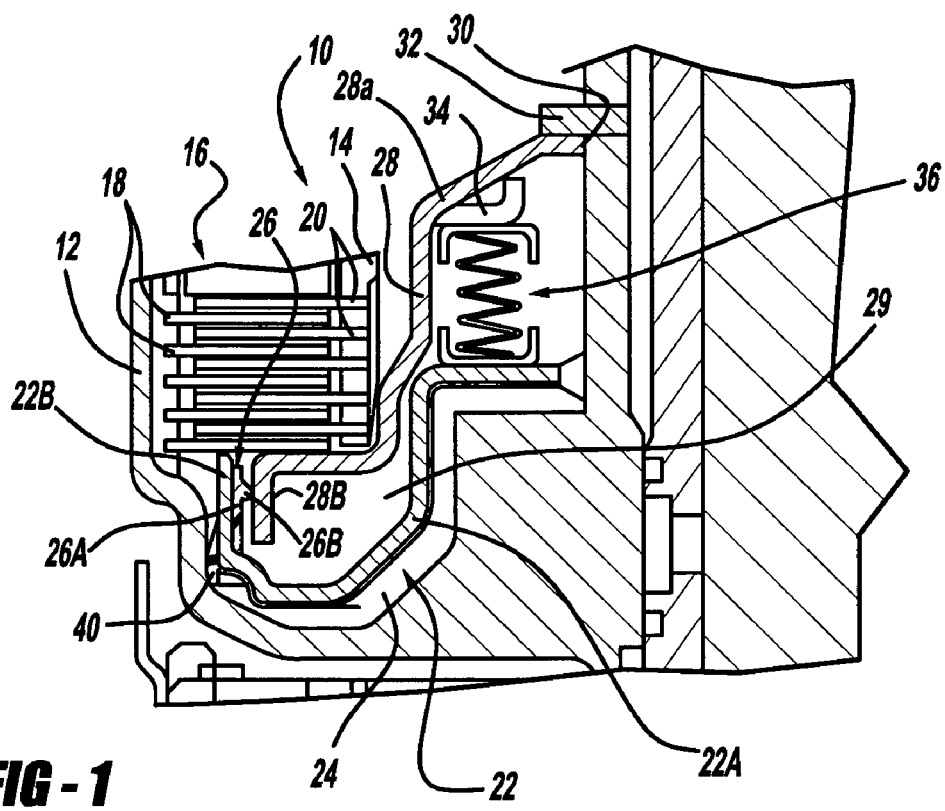
FIG. 1 is a cross-sectional view of a clutch and balance piston assembly incorporating a seal according to the principles of the present invention.
Figure 2:
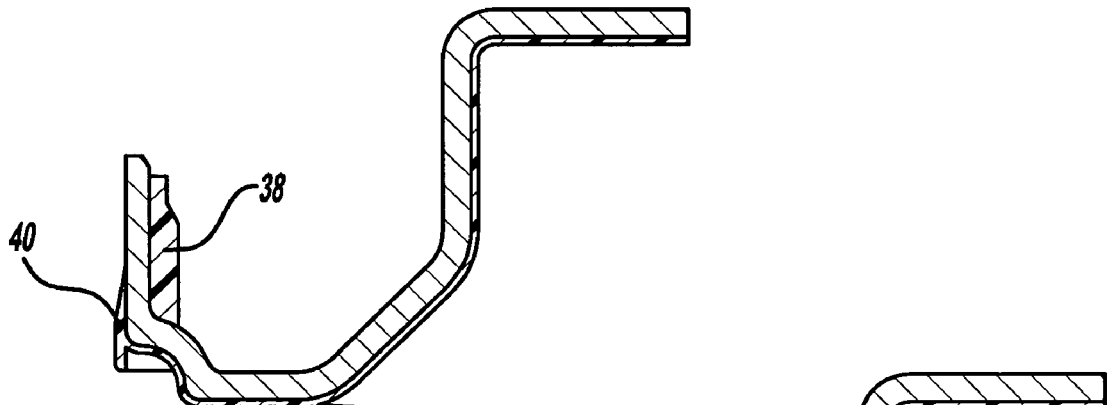
FIG. 2 is a cross-sectional view illustrating the forming of a pre-molded slab portion on the apply piston.
Figure 3:
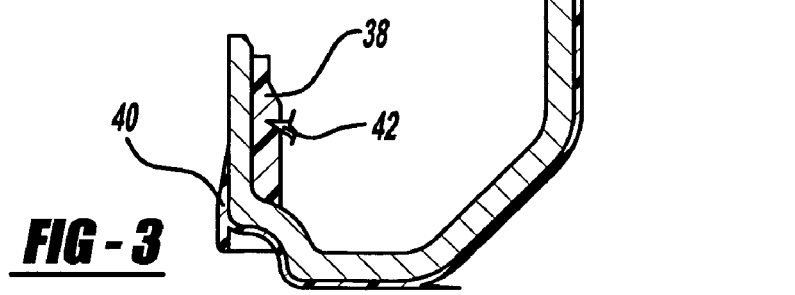
FIG. 3 is a cross-sectional view illustrating the cutting process for forming the lip profile into the premolded slab portion of the seal provided on the apply piston according to the principles of the present invention.
Figure 8:
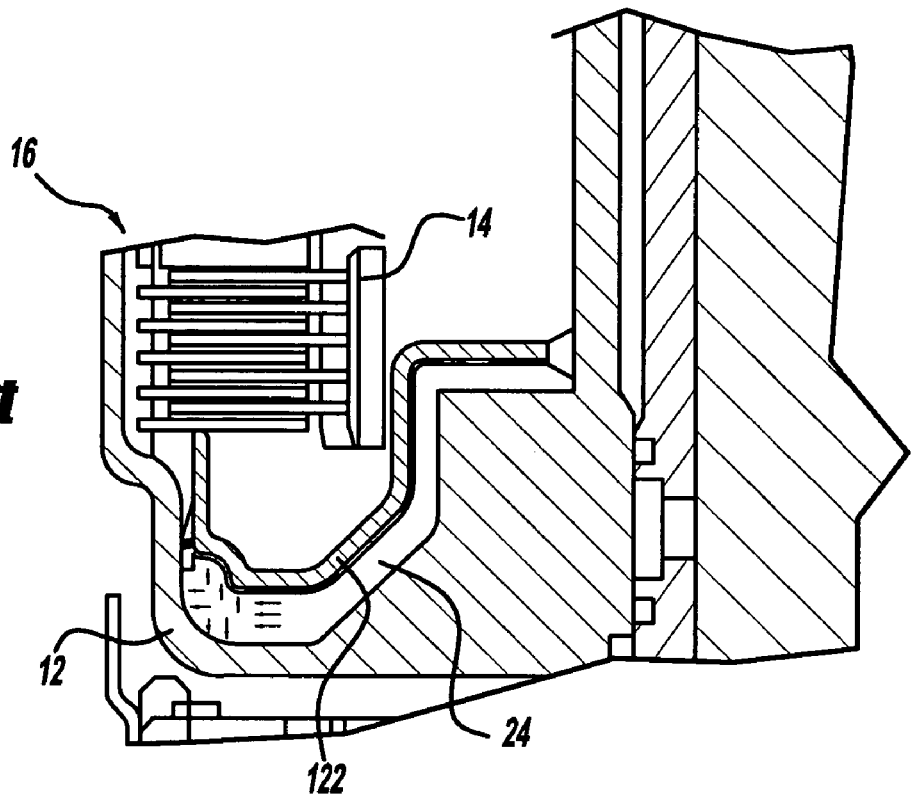
FIG. 8 is a cross-sectional view of a conventional clutch system with an apply piston.
Figure 9:
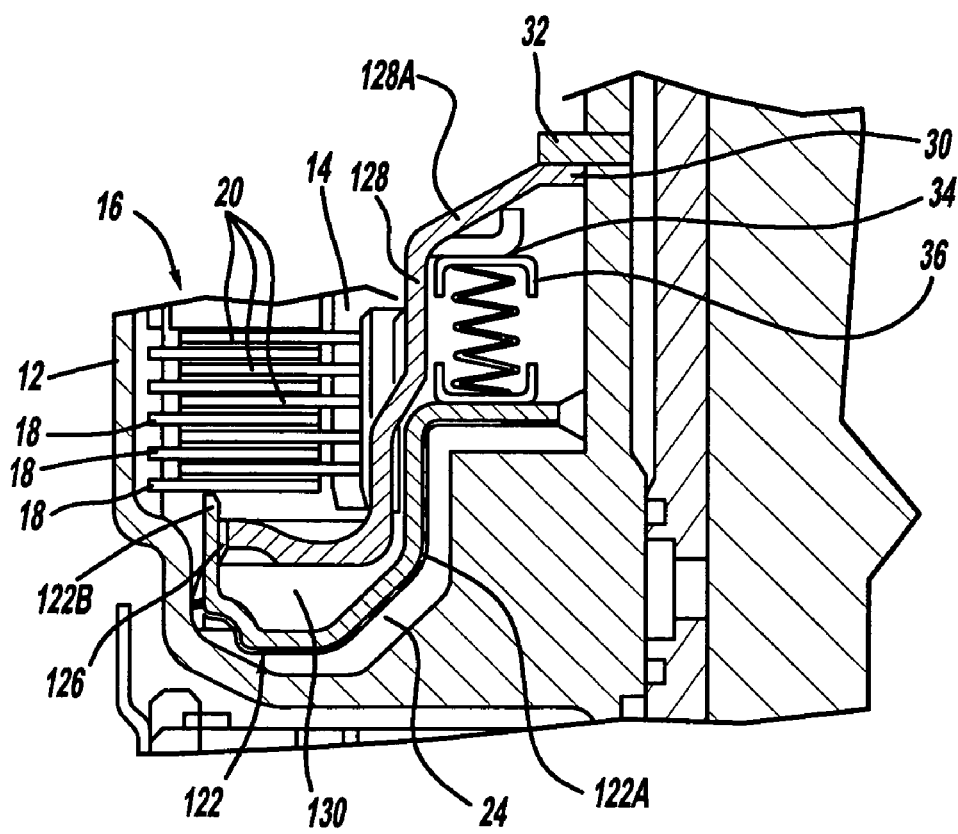
FIG. 9 is a cross-sectional view of a prior art clutch system having an apply piston and balance piston.

With reference to FIGS. 1–3, the clutch assembly 10, according to the principles of the present invention, will now be described. The clutch assembly 10 includes a first member 12 and a second member 14 rotatable relative to the first member 12. A clutch pack 16 includes a plurality of clutch plates 18 having external splines which engage internal splines of the first member 12 and a plurality of clutch plates 20 having internal splines connected to external splines of rotatable second member 14. An apply piston 22 is provided in a piston chamber 24 provided in the first member 12. The apply piston includes a radially extending hub portion 22A and an axially extending arm portion 22B which presses against the clutch pack 16. A seal 26 is provided on an inner surface of the axially extending arm portion 22B and includes a molded slab body portion 26A and a lip profile 26B.

A balance piston 28 is provided between the clutch pack 16 and the apply piston 22. The balance piston includes an inner hub portion 28A with a central aperture 30 which is received on the shaft portion of member 12. The balance piston 28 is disposed against a stop ring 32 and includes a spring seat portion 34 against which a return spring assembly 36 is disposed. Return spring assembly 36 also presses against the radially extending hub portion 22A of the apply piston in order to bias the apply piston to a disengaged position. Hydraulic pressure generated in the piston chamber 24 causes the apply piston 22 to move against the biasing force of the spring assembly 36 and into engagement with clutch pack 16 for causing frictional engagement between first member 12 and rotatably member 14. The balance piston 28 includes an axially extending outer portion 28B which is disposed against the seal lip profile 26B of seal 26. The seal 26, along with balance piston 28 and apply piston 22 define a balance chamber 29 that offsets the pressure generated by the centrifugal force on the fluid in the piston chamber 24.

With reference to FIGS. 2 and 3, a method of forming the seal 26, according to the principles of the present invention, will now be described. As shown in FIG. 2, a molded slab of rubber 38 is formed to the interior surface of the axially extending arm portion 22B of the apply piston 22. It is noteworthy at this point that the apply piston also includes a molded-on exterior seal 40, and that the molded slab 38 and seal 40 can be applied simultaneously in a single mold cavity. With reference to FIG. 3, a trimming process is illustrated for forming the lip profile 26B in the seal 26. A blade 42, as is know in the art, is used for creating the lip profile 26B. It is noteworthy at this point that the exterior seal 40 typically requires cutting in a post-molded state to remove material flash typically created at the exterior seal 40, and that the cutting process for the exterior seal 40 and interior seal 26 can be performed simultaneously without a significant increase in cost. By placing the seal 26 on the apply piston 22 as opposed to the prior art technique of applying a seal to the balance piston 28, the cost of manufacturing the balance piston 28 is greatly reduced while the cost of manufacturing the apply piston 22 is insignificantly affected since molding processes and trimming processes are already required for the apply piston 22.

With reference to FIGS. 4 and 5, an alternative seal 50 is shown applied to the interior surface of the axially extending arm portion 22B of the apply piston 22. The seal 50 includes a body portion 51 which is bonded to the apply piston 22 and includes an axially extending skirt 52 extending from an end of the body portion 51. As illustrated in FIG. 5, the balance piston 28' includes a generally J-shaped end portion 54 in which the axially extending skirt 52 is received. The post-molded outside diameter of the lip is designed to interfere with the outside diameter of the balance piston. The slight stretching of the rubber "skirt" 52 is meant to be a means by which the contact between the rubber and the balance piston is maintained. Since only positive pressure occurs in the cavity between the apply piston and the balance piston, this pressure tends to maintain the position of the rubber "skirt" 52.

With reference to FIGS. 6 and 7, a second alternative embodiment of the present invention will now be described. With reference to FIG. 6, a seal 60 includes a body portion 62 which is bonded to the interior surface of the axially extending arm portion 22B of the apply piston 22. An axially extending lip portion 64 extends from the body portion 62 and includes a recess portion 66 on the radially outer surface thereof. The lip 64 is bent radially inward and mated with an exterior surface 68 of a balance piston 28". The lip portion 64 can be bonded to the balance piston 28" by adhesives or otherwise fastened thereto. The seal configurations of FIGS. 5 and 7 allow relative axial movement between the balance piston and apply piston while still maintaining a sealed relationship therebetween. The function of each of the seal systems of FIGS. 5 and 7 operates the same as the seal 26 as discussed above with respect to FIG. 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch assembly, comprising:
   a first member;
   a second member rotatable relative to said first member;
   a clutch pack including at least one first clutch disc attached to said first member and at least one second clutch disc attached to said second member;
   an apply piston operable for applying axial pressure on said clutch pack, said apply piston including a radially extending hub portion and an axially extending arm portion an end of which is disposed against said clutch pack, said apply piston having a seal bonded to an inner surface of said axially extending arm portion, said seal includes an annular lip profile extending radially inward from an annular seal body; and
   a balance piston disposed between said apply piston and said clutch pack, said balance piston having an outer surface slidably engaging said lip profile of said seal.

2. The clutch assembly according to claim 1, wherein said seal is molded to said inner surface of said axially extending arm portion.

3. A clutch assembly, comprising:
   a first member;
   a second member rotatable relative to said first member;
   a clutch pack including at least one first clutch disc attached to said first member and at least one second clutch disc attached to said second member;
   an apply piston operable for applying axial pressure on said clutch pack, said apply piston including a radially extending hub portion and an axially extending arm portion an end of which is disposed against said clutch pack, said apply piston having a seal fixedly disposed on an inner surface of said axially extending arm portion;
   a balance piston disposed between said apply piston and said clutch pack, said balance piston having an outer surface engaging said seal;
   wherein said seal includes a lip fastened to said outer surface of said balance piston.

4. A clutch assembly, comprising:
   a first member;
   a second member rotatable relative to said first member;
   a clutch pack including at least one first clutch disc attached to said first member and at least one second clutch disc attached to said second member;
   an apply piston operable for applying axial pressure on said clutch pack, said apply piston including a radially extending hub portion and an axially extending arm portion an end of which is disposed against said clutch pack, said apply piston having a seal fixedly disposed on an inner surface of said axially extending arm portion;
   a balance piston disposed between said apply piston and said clutch pack, said balance piston having an outer surface engaging said seal;
   wherein said seal includes a lip received in a formed portion of said outer surface of said balance piston.

* * * * *